United States Patent
Babbush et al.

(10) Patent No.: US 12,346,770 B2
(45) Date of Patent: *Jul. 1, 2025

(54) VARIATIONAL QUANTUM STATE PREPARATION

(71) Applicant: Google LLC, Mountain View, CA (US)

(72) Inventors: Ryan Babbush, Venice, CA (US); Ian David Kivlichan, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,705

(22) Filed: May 2, 2024

(65) Prior Publication Data

US 2024/0289659 A1 Aug. 29, 2024

Related U.S. Application Data

(63) Continuation of application No. 16/967,339, filed as application No. PCT/US2019/045412 on Aug. 7, 2019, now Pat. No. 12,008,433.
(Continued)

(51) Int. Cl.
*G06N 10/20* (2022.01)
*G06F 15/16* (2006.01)

(52) U.S. Cl.
CPC ............ *G06N 10/20* (2022.01); *G06F 15/16* (2013.01)

(58) Field of Classification Search
None
See application file for complete search history.

(56) References Cited

U.S. PATENT DOCUMENTS 10,832,155 B2 11/2020 Lechner et al.
10,984,152 B2 4/2021 Rubin et al.
(Continued)

FOREIGN PATENT DOCUMENTS

JP 2018-022446 2/2018
KR 10-2018-0022925 3/2018

OTHER PUBLICATIONS

M.B. Hastings et al., "Distillation with Sublogarithmic Overhead," 2018 American Physical Society, Physical Review Letters, vol. 120, No. 5, 3 pages. (Year: 2018).*
(Continued)

*Primary Examiner* — Leigh M Garbowski
(74) *Attorney, Agent, or Firm* — Fish & Richardson P.C.

(57) ABSTRACT

Methods, systems and apparatus for performing quantum state preparation. In one aspect, a method includes the actions of defining a target quantum state of a quantum system, wherein time evolution of the quantum system is governed by a target Hamiltonian, and defining a total Hamiltonian that interpolates between an initial Hamiltonian and the target Hamiltonian, wherein the total Hamiltonian is equal to the initial Hamiltonian at an initial time and is equal to the target Hamiltonian at a final time; approximating the time evolution of the total Hamiltonian using a truncated linear combination of unitary simulations to generate a truncated time evolution operator; evolving a ground state of the initial Hamiltonian according to the truncated time evolution operator for a truncated number of time steps to generate an intermediate state; and variationally adjusting the intermediate state to determine a wavefunction that approximates the target quantum state of the quantum system.

12 Claims, 2 Drawing Sheets

Related U.S. Application Data

(60) Provisional application No. 62/715,615, filed on Aug. 7, 2018.

(56) References Cited

U.S. PATENT DOCUMENTS

| | | | |
|---|---|---|---|
| 11,562,285 B2 | 1/2023 | Babbush et al. | |
| 11,593,707 B2 | 2/2023 | Romero et al. | |
| 11,809,959 B2 * | 11/2023 | Low | G06N 10/20 |
| 12,008,433 B2 * | 6/2024 | Babbush | G06N 10/20 |
| 2019/0220497 A1 | 7/2019 | Wiebe et al. | |
| 2020/0065439 A1 | 2/2020 | Babbush et al. | |

OTHER PUBLICATIONS

Berry et al., "Simulating Hamiltonian dynamics with a truncated Taylor series" CoRR, Submitted on Dec. 2014, arXiv:1412.4687v1, 5 pages.

International Preliminary Report on Patentability in International Appln. No. PCT/US2019/045412, mailed on Feb. 18, 2021, 6 pages.

International Search Report and Written Opinion in International Appln. No. PCT/US2019/045412, mailed on Nov. 28, 2019, 11 pages.

McClean Jr et al., "The theory of variational hybrid quantum-classical algorithms" New Journal of Physics, 2016, 23 pages.

Moll et al., "Quantum optimization using variational algorithms on near-term quantum devices" Quantum Science and Technology, Oct. 2017, 3(3):1-30.

Office Action in Canadian Appln. No. 3,091,246, mailed on Sep. 29, 2021, 3 pages.

Yung et al., "Introduction to Quantum Algorithms for Physics and Chemistry" Harvard Library, Mar. 2012, 1-44.

Zagury et al., "Unitary expansion of the time evolution operator" Phys. Rev. A., 82(4):042110, Oct. 2010, 6 pages.

* cited by examiner

1

VARIATIONAL QUANTUM STATE PREPARATION

CROSS-REFERENCE TO RELATED APPLICATION

This application is a continuation application and claims priority under 35 U.S.C. § 120 to U.S. patent application Ser. No. 16/967,339, filed on Aug. 4, 2020, which is a National Stage Application under 35 U.S.C. § 371 and claims the benefit of International Application No. PCT/US2019/045412, filed Aug. 7, 2019, which claims priority to U.S. Application No. 62/715,615, filed Aug. 7, 2018. The disclosure of the prior applications are considered part of and are incorporated by reference in the disclosure of this application.

BACKGROUND

This specification relates to quantum computing.

Quantum computing devices use quantum-mechanical phenomena such as superposition and entanglement to perform operations on data. Quantum computing devices operate using two-level quantum mechanical systems called qubits. For example, the circuit model for quantum computation performs quantum computations by applying sequences of quantum logic gates on an n-qubit register.

SUMMARY

This specification describes techniques for preparing quantum states.

In general, one innovative aspect of the subject matter described in this specification can be implemented in a method for performing quantum state preparation, the method including: defining (i) a target quantum state of a quantum system, wherein time evolution of the quantum system is governed by a target Hamiltonian, and (ii) a total Hamiltonian that interpolates between an initial Hamiltonian and the target Hamiltonian, wherein the total Hamiltonian is equal to the initial Hamiltonian at an initial time and is equal to the target Hamiltonian at a final time; approximating the time evolution of the total Hamiltonian using a truncated linear combination of unitary simulations to generate a truncated time evolution operator; evolving a ground state of the initial Hamiltonian according to the truncated time evolution operator for a truncated number of time steps to generate an intermediate state; and variationally adjusting the intermediate state to determine a wavefunction that approximates the target quantum state of the quantum system.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations variationally adjusting the intermediate state to determine a wavefunction that approximates the target quantum state of the quantum system comprises: defining a variational ansatz wavefunction dependent on one or more variational parameters as being equal to the action of a parameterized quantum circuit applied to the intermediate state; performing a variational algorithm using the defined variational ansatz wavefunction to determine fixed values of the one or more variational parameters; and using the fixed values of the one or more variational parameters to define the wavefunction that approximates the target quantum state of the quantum system.

In some implementations the fixed values of the one or more variational parameters minimize an energy expectation of the target Hamiltonian.

In some implementations the linear combination of unitary simulations comprises a Taylor series simulation.

In some implementations the truncated number of time steps scales less than a sub logarithmically in error.

In some implementations the evolution of the ground state of the Hamiltonian is adiabatic.

In some implementations the method further comprises iteratively increasing the truncated number of time steps until the defined wavefunction that approximates the target quantum state of the quantum system for each iteration converges.

In some implementations the truncation of the truncated linear combination of unitary simulations is dependent on a first predetermined error tolerance.

In some implementations the predetermined error tolerance is dependent on limitations of computational hardware implementing the method.

In some implementations the truncation of the truncated linear combination of unitary simulations is dependent on a second predetermined error tolerance that is higher than the first predetermined error tolerance, and the truncated number of time steps scales sub logarithmically in the error.

In some implementations the target Hamiltonian describes a physical quantum system, and the defined wavefunction that approximates the target quantum state of the quantum system is used to simulate the physical quantum system.

In some implementations simulating the physical quantum system comprises determining physical properties of the physical system.

In some implementations the method further comprises encoding a solution to an optimization task in the target quantum state; and using the defined wavefunction that approximates the target quantum state of the quantum system to determine an approximate solution to the optimization task.

The disclosed subject matter can be implemented in particular ways so as to realize one or more of the following advantages.

In some implementations the disclosed systems and methods for preparing quantum states of respective quantum systems may be computationally more efficient compared to other systems and methods for preparing quantum states of respective quantum systems. In particular, by defining a variational ansatz using linear combinations of unitaries simulations of time evolution, e.g., a Taylor series strategy of time-evolution, the number of time steps performed during time evolution of the quantum system for a given target precision may be reduced. For example, compared to systems and methods that prepare quantum states through Trotterization of adiabatic state preparation, the disclosed systems and methods may require exponentially fewer steps in terms of the target precision, scaling sub-logarithmically in the inverse precision. Fewer time steps may therefore be taken, improving the computational efficiency.

In addition, in some implementations quantum states prepared using the disclosed systems and methods may be more accurate compared to quantum states prepared using other systems and methods for quantum state preparation. For example, compared to systems and methods that prepare quantum states through Trotterization of adiabatic state preparation, the disclosed systems and methods may achieve greater precision using a same number of time steps.

Furthermore, in some implementations the use of truncated Taylor series or other linear combinations of unitaries may decrease the number of Toffoli quantum logic gates required to perform quantum state preparation compared to other methods for quantum state preparation, e.g., those that use Trotterization.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
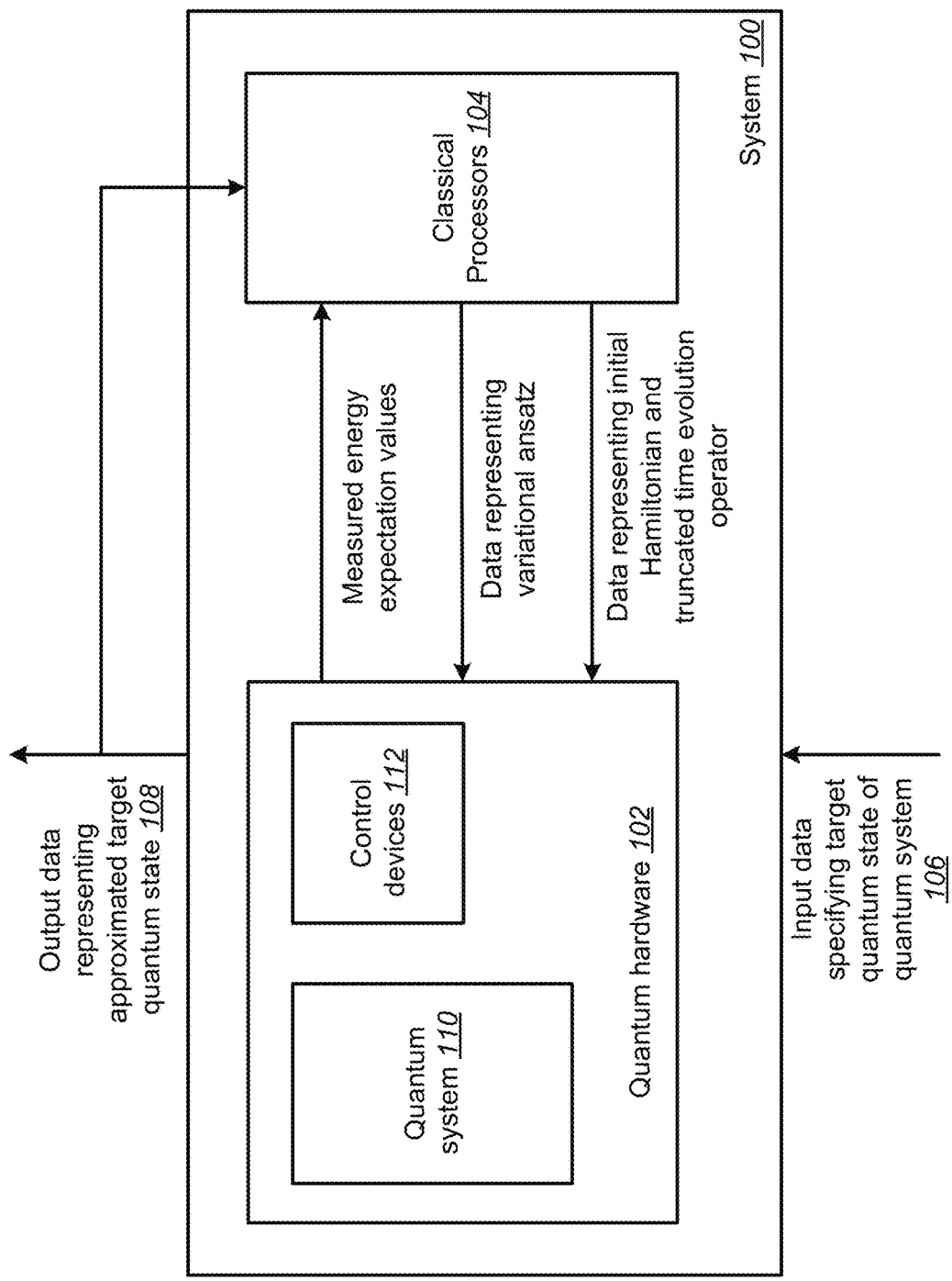
FIG. 1 shows a block diagram of an example computing system.

Applications of quantum computing may require that a quantum computing system prepare, or solve for, a quantum state Iip) of a quantum system that is an energy eigenstate of a Hamiltonian H governing the evolution of the quantum system. For example, in applications of quantum simulation a physical system of interest, e.g., a material or chemical, may be described by a corresponding Hamiltonian. To determine properties of the physical system, it may be required that one or more energy eigenstates of the Hamiltonian describing the physical system are determined. As another example, in applications of machine learning a solution to an optimization task may be encoded into the ground state of a particular quantum system. To determine the solution to the optimization task, it may be required to determine, e.g., solve for, the ground state of the quantum system.

A Hamiltonian describing a quantum system may be highly complex since the dimension of the quantum system grows exponentially with the system size. Determining energy eigenvalues and eigenstates of such a Hamiltonian is therefore a computationally challenging, if not infeasible, task.

One example technique for preparing or solving for a target quantum state of a given quantum system includes adiabatic quantum state preparation. Adiabatic quantum state preparation is a method for determining a target ground state of a quantum system using the adiabatic theorem. The time evolution of a quantum system is governed by a Hamiltonian that interpolates between an initial Hamiltonian, whose ground state is known and easy to construct or determine, and a final Hamiltonian, whose ground state is the target ground state. To ensure that the quantum system evolves to the target ground state, the quantum system must evolve for a period of time that depends on a minimum energy difference between the two lowest eigenstates of the interpolating Hamiltonian.

Another example technique for preparing or solving for a target quantum state of a given Hamiltonian includes applications of variational algorithms. For example, in cases where it is required to prepare or solve for a quantum state $|\psi_0\rangle$ which is a lowest energy eigenstate of a Hamiltonian H such that $H|\psi_0\rangle=E_0|\psi_0\rangle$, $|\psi_0\rangle$ may be approximated by parameterizing a guess wavefunction $|\phi(\vec{\theta})\rangle$, known as a variational ansatz, in terms of parameters denoted by the vector $\vec{\theta}$. The quantum variational principle then holds that $$\frac{\langle\phi(\vec{\theta})|H|\phi(\vec{\theta})\rangle}{\langle\phi(\vec{\theta})|\phi(\vec{\theta})\rangle} \geq E_0,$$

with equality when $|\phi(\vec{\theta})\rangle=|\psi_0\rangle$. Accordingly, $|\psi_0\rangle$ may be approximated with $|\phi(\vec{\theta})\rangle$ by solving for $\vec{\theta}$ which makes the above inequality as tight as possible within the parameterization. In some implementations, the guess wavefunction $|\phi(\vec{\theta})\rangle$ may be parameterized by the action of a corresponding parameterized quantum circuit $U(\vec{\theta})$ on an initial state $|\phi\rangle$, i.e., $|\phi(\vec{\theta})\rangle=U(\vec{\theta})|\phi\rangle$, where $|\phi\rangle$ is a quantum state that is trivial to prepare.

This specification describes systems and methods for performing quantum state preparation using a variational algorithm that is applied to truncated linear combinations of unitary simulations. For convenience, this specification describes performing quantum state preparation using a variational algorithm that is applied to truncated Taylor series simulations. However, this is one example of simulations that may be used using the techniques described in this specification. In settings where other simulations are used, the following techniques and arrangements may still be used.

Example Operating Environment

FIG. 1 depicts an example system 100 for performing quantum state preparation. The example system 100 is an example of a system implemented as classical or quantum computer programs on one or more classical computers or quantum computing devices in one or more locations, in which the systems, components, and techniques described below can be implemented.

The system 100 includes quantum hardware 102 in data communication with a classical processor 104. The system 100 may receive as input data that may include data specifying a target quantum state of a quantum system, e.g., input data 106. The system may generate as output data representing an approximation of the target quantum state or data representing a measured property of the target quantum state, e.g., output data 108.

In some implementations the received data specifying the target quantum state of the quantum system may include data representing a quantum state of a physical system that is to be modeled or simulated, e.g., the ground state of a physical system. In some implementations the received data may represent a physical system that is a material, e.g., a metal or polymer.

In these implementations the generated output data representing an approximation of the target quantum state or data representing a measured property of the target quantum state may be provided for further processing or analyzing, e.g., as part of a quantum simulation process. For example, in cases where the physical system is a material, e.g., a metal or polymer, the generated output data may be used to determine properties of the material, e.g., its conductivity.

In some implementations the received data specifying the target quantum state of the quantum system, e.g., input data 106, may include data representing a quantum state that encodes a solution to an optimization task. In these implementations the generated output data representing an approximation of the target quantum state, e.g., output data 108, may be used to determine an approximate solution to the optimization task.

The system 100 may be configured to perform classical computations, quantum computations or classical computations in combination with quantum computations using quantum hardware 102 and classical processors 104.

The quantum hardware 102 may include components for performing quantum computation. For example, the quantum hardware 102 may include a quantum system 110 (the quantum system whose target quantum state is to be prepared). The quantum system 110 may include one or more multi-level quantum subsystems, e.g., qubits or qudits. In some implementations the multi-level quantum subsystems may be superconducting qubits, e.g., Gmon qubits. The type of multi-level quantum subsystems that the system 100 utilizes is dependent on the physical system of interest. For example, in some cases it may be convenient to include one or more resonators attached to one or more superconducting qubits, e.g., Gmon or Xmon qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits. In some cases the multi-level quantum subsystems may be a part of a quantum circuit.

The quantum hardware 102 further includes one or more control devices 112 that operate the quantum system. For example, the control devices can include control electronics that are connected to the multi-level quantum subsystems and whose actions can realize one or more quantum logic gates or circuits of quantum logic gates, which operate on the quantum system 110.

The quantum hardware 102 may be configured to perform quantum measurements on the quantum system 110 and send measurement results to the classical processors 104. For example, the quantum hardware may be configured to perform quantum measurements on the quantum system to estimate an energy expectation value of a quantum state representing the quantum system 110. The classical processors 104 may be configured to receive measurement results from the quantum hardware 102.

The classical processors 104 include components for performing classical computations. The classical processors 104 are configured to receive data representing a target quantum state of the quantum system 110 and to define a time dependent total Hamiltonian that interpolates between an initial Hamiltonian whose eigenstates, e.g., ground state, are efficient to prepare and a target Hamiltonian that characterizes the time evolution of the quantum system 110. The initial Hamiltonian can be defined based on the quantum hardware 102. The classical processors 104 are further configured to generate a truncated time evolution operator that approximates the time evolution of the total Hamiltonian, as described in more detail below with reference to FIG. 2.

The classical processors 104 provide data representing the defined initial Hamiltonian and generated truncated time evolution operator to the quantum hardware 102. The quantum hardware 102 can evolve an eigenstate, e.g., the ground state, of the initial Hamiltonian according to the truncated time evolution operator for a predetermined number of time steps to generate an intermediate quantum state of the quantum system.

The system 100 is configured to perform classical computations and quantum computations to perform a variational algorithm using a defined variational ansatz and the intermediate quantum state to determine variational parameters that minimize the energy expectation of the target Hamiltonian. The variational parameters that minimize the energy expectation of the target Hamiltonian define an approximation to the target quantum state specified by the input data 106.

Programming the Hardware

Figure 2:
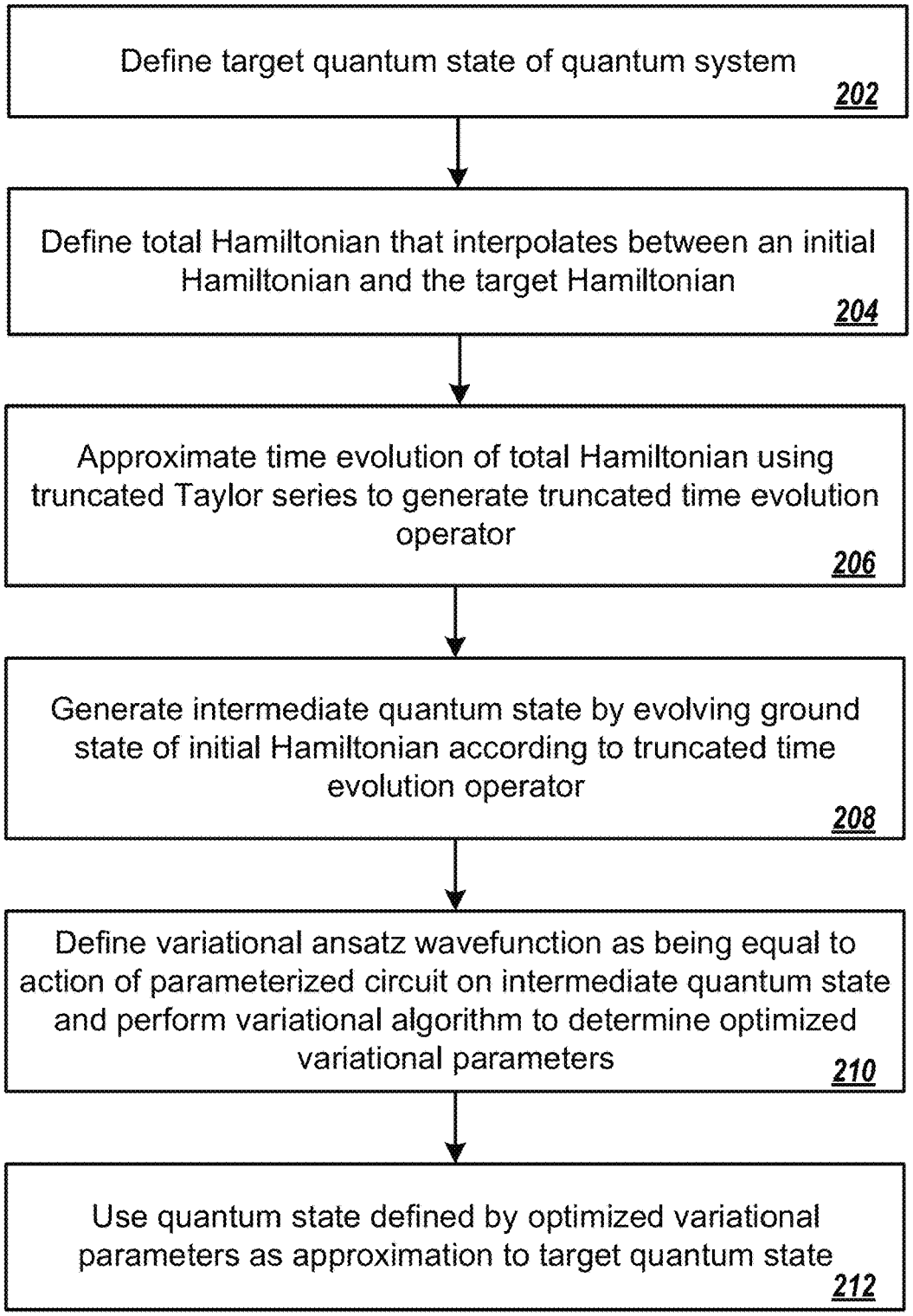
FIG. 2 is a flowchart of an example process for variational quantum state preparation.

FIG. 2 is a flow diagram of an example process for performing quantum state preparation. For convenience, the process 200 will be described as being performed by a system of one or more classical or quantum computing devices located in one or more locations. For example, a quantum computation system, e.g., the system 100 of FIG. 1, appropriately programmed in accordance with this specification, can perform the process 200.

The system defines a target quantum state $|\psi_0\rangle$ of a quantum system (step 202). In some implementations the target quantum state may be an eigenstate of a target Hamiltonian $H_{final}$ that governs the time evolution of the quantum system. For example, the target quantum state may be a ground state of a target Hamiltonian.

The system defines a time dependent total Hamiltonian H that interpolates between an initial Hamiltonian and the target Hamiltonian (step 204). The total Hamiltonian is defined at time t=0 to equal the initial Hamiltonian and at time t=T for real valued T to equal the target Hamiltonian. The initial Hamiltonian may be a Hamiltonian whose eigenstates, e.g., the ground state, can be prepared efficiently. Under the adiabatic theorem, evolving the quantum system adiabatically according to the total Hamiltonian ensures that the quantum system remains in an instantaneous eigenstate of the total Hamiltonian.

The system approximates the time evolution of the total Hamiltonian using a truncated Taylor series to generate a truncated time evolution operator (step 206). The truncation of the Taylor series used to generate the truncated time evolution operator is dependent on a predetermined precision or error tolerance. In some implementations the error tolerance may be based on limitations of the computational hardware/device implementing the method for quantum state preparation. For example, the error tolerance may be chosen based on the largest circuit that is possible given either the fidelity and decoherence of a near-term device or given the limitations imposed by a number of physical qubits (and thus number of permissible T gates).

The system evolves an eigenstate, e.g., the ground state, of the initial Hamiltonian according to the truncated time evolution operator for a predetermined number of time steps n to generate an intermediate quantum state $|\psi_n\rangle$ (step 208). More specifically, the system evolves an eigenstate of the initial Hamiltonian corresponding to the target quantum state of the target Hamiltonian, e.g., if the target quantum state is a ground state of the target Hamiltonian the system evolves a ground state of the initial Hamiltonian. Evolving the eigenstate of the initial Hamiltonian according to the truncated time evolution operator for a predetermined number of time steps can include performing a quantum simulation or quantum computation that realizes the action of the truncated time evolution operator for the predetermined number of steps.

In some implementations the predetermined number of time steps n may be less than the number of time steps used in conventional quantum state preparation methods, e.g., less than $O(|H|tk)$ where $k=\log(|H|t/\epsilon)/\log \log(|H|t/\epsilon)$ and $\epsilon$ represents predetermined error. For example, the predetermined number of time steps may scale at a rate that is less than sub logarithmically. Because the number of time steps is less than the number of time steps used in conventional methods for quantum state preparation, the evolution may be more "coarse grained". Therefore, the intermediate quantum state $|\psi_n\rangle$ may not be the same as or close to the target quantum state $|\psi_0\rangle$, e.g., the intermediate quantum state may not satisfy a first error tolerance.

The sizes of the n time steps are chosen such that the evolution of the ground state is adiabatic.

The system defines a variational ansatz wavefunction $|\phi(\vec{\theta})\rangle$ as being equal to the action of a parameterized quantum circuit $U(\vec{\theta})$ on the intermediate quantum state $|\psi_n\rangle$, i.e., $|P(\vec{\theta})\rangle = U(\vec{\theta})|\psi_n\rangle$, where $\vec{\theta}$ represents variational parameters, e.g., quantum circuit parameters. The quantum circuit $U(\vec{\theta})$ can be implemented by quantum hardware included in the system.

The system performs a variational algorithm to determine an optimized set of variational parameters $\theta_{optimal}$ (step 210). The system repeatedly applies the parameterized quantum circuit $U(\vec{\theta})$ to the intermediate quantum state $|\psi_n\rangle$ and measures the quantum system using the target Hamiltonian as an observable to determine an energy expectation value. The system then performs a classical optimization with respect to the variational parameters to determine a minimizing set of parameters $\theta_{optimal}$ that minimizes the energy expectation of the target Hamiltonian.

The system uses the quantum state $|\phi(\theta_{optimal})\rangle = U(\theta_{optimal})|\psi_n\rangle$ as an approximation to the target quantum state (step 212). In some implementations the system may use the quantum state to perform quantum simulations, e.g., determine properties about the quantum system described by the target quantum state. In other implementations the system may have encoded a solution to an optimization task in the target quantum state and may use the approximated quantum state to determine an approximate solution to the optimization task. Determining properties about the quantum system or an approximate solution to the optimization task may include measuring the approximation to the target quantum state, e.g., to determine an energy eigenvalue.

In some implementations the system may further perform many iterations of the above described steps until the approximated quantum state converges. For example, the system may sequentially increase the number of truncated time steps from an initial number of steps, e.g., 1 step, until the generated approximate state $|\phi(\theta_{optimal})\rangle = U(\theta_{optimal})|\psi_n\rangle$ obtained from a respective intermediate state $|\psi_n\rangle$ converges or is otherwise determined to be close enough to the target quantum state.

In some implementations the system may apply a second error tolerance when generating the truncated time evolution operator that is higher than the first error tolerance. The system may then evolve the ground state of the initial Hamiltonian according to the truncated time evolution operator for a "complete" number of time steps, e.g., a number of time steps that is in accordance with conventional methods for quantum state preparation, to generate an intermediate quantum state. The generated quantum state can also be referred to as "intermediate" (despite full time evolution being performed) because the increased error tolerance means that the intermediate quantum state may not be close enough to the target quantum state as originally required. However, by applying the particular above described variational methods, the intermediate quantum state is improved and may satisfy the first error tolerance.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by quantum computing hardware and one or more classical processors for preparing an eigenstate of a Hamiltonian, the method comprising:
   evolving, by the quantum computing hardware, an initial quantum state of a system of physical qubits included in the quantum computing hardware according to a time evolution operator to generate an intermediate quantum state, wherein the time evolution operator comprises a truncation of the Hamiltonian, the evolving is performed for a truncated number of time steps, and the truncated number of time steps scales at a rate that is less than sub-logarithmic in a first predetermined error tolerance; and
   variationally adjusting, by the quantum computing hardware and the one or more classical processors, the intermediate quantum state of the system of physical qubits to determine a wavefunction that approximates the eigenstate of the Hamiltonian and satisfies the first predetermined error tolerance.

2. The method of claim 1, wherein variationally adjusting the intermediate quantum state to determine a wavefunction that approximates the eigenstate of the Hamiltonian comprises:
   defining, by the one or more classical processors, a variational ansatz wavefunction dependent on one or more variational parameters as being equal to an action of a parameterized quantum circuit applied to the intermediate state;
   performing by the quantum computing hardware and the one or more classical processors, a variational algorithm using the defined variational ansatz wavefunction to determine fixed values of the one or more variational parameters; and
   using, by the one or more classical processors, the fixed values of the one or more variational parameters to define the wavefunction that approximates the eigenstate of the Hamiltonian.

3. The method of claim 2, further comprising iteratively increasing the truncated number of time steps until the wavefunction that approximates the eigenstate of the Hamiltonian converges.

4. The method of claim 2, wherein the fixed values of the one or more variational parameters minimize an energy expectation of the Hamiltonian.

5. The method of claim 1, wherein the intermediate quantum state does not satisfy the first predetermined error tolerance.

6. The method of claim 1, wherein the truncation of the Hamiltonian is dependent on a second predetermined error tolerance, wherein the second predetermined error tolerance is dependent on limitations of the quantum computing hardware, wherein the limitations comprise one or more of: a fidelity of quantum computations performed by the quantum computing hardware, a decoherence of the quantum computing hardware, or the number of physical qubits included in the quantum computing hardware.

7. The method of claim 6, wherein
   the truncation of the Hamiltonian is dependent on the second predetermined error tolerance, wherein the second predetermined error tolerance is higher than the first predetermined error tolerance.

8. An apparatus comprising:
   quantum computing hardware comprising:
      a system of physical qubits;
      control electronics connected to the system of physical qubits and configured to operate the system of physical qubits; and
   one or more classical processors;
   wherein the apparatus is configured to perform operations for preparing an eigenstate of a Hamiltonian, the operations comprising:
   evolving, by the quantum computing hardware, an initial quantum state of the system of physical qubits according to a time evolution operator to generate an intermediate quantum state of the system of physical qubits, wherein the time evolution operator comprises a truncation of the Hamiltonian, the evolving is performed for a truncated number of time steps, and the truncated number of time steps scales at a rate that is less than sub-logarithmic in a first predetermined error tolerance; and
   variationally adjusting, by the quantum computing hardware and the one or more classical processors, the intermediate quantum state of the system of physical qubits to determine a wavefunction that approximates the eigenstate of the Hamiltonian and satisfies the first predetermined error tolerance.

9. The apparatus of claim 8, wherein variationally adjusting the intermediate quantum state to determine a wavefunction that approximates the eigenstate of the Hamiltonian comprises:
   defining, by the one or more classical processors, a variational ansatz wavefunction dependent on one or more variational parameters as being equal to an action of a parameterized quantum circuit applied to the intermediate state;
   performing by the quantum computing hardware and the one or more classical processors, a variational algorithm using the defined variational ansatz wavefunction to determine fixed values of the one or more variational parameters; and
   using, by the one or more classical processors, the fixed values of the one or more variational parameters to define the wavefunction that approximates the eigenstate of the Hamiltonian.

10. The apparatus of claim 9, further comprising iteratively increasing the truncated number of time steps until the wavefunction that approximates the eigenstate of the Hamiltonian converges.

11. The apparatus of claim 9, wherein the fixed values of the one or more variational parameters minimize an energy expectation of the Hamiltonian.

12. The apparatus of claim 8, wherein the intermediate quantum state does not satisfy the first predetermined error tolerance.

* * * * *